Oct. 15, 1929.　　　D. I. FOGGER　　　1,732,006
FOUR-WHEEL TRAILER
Filed May 2, 1927　　　4 Sheets-Sheet 1
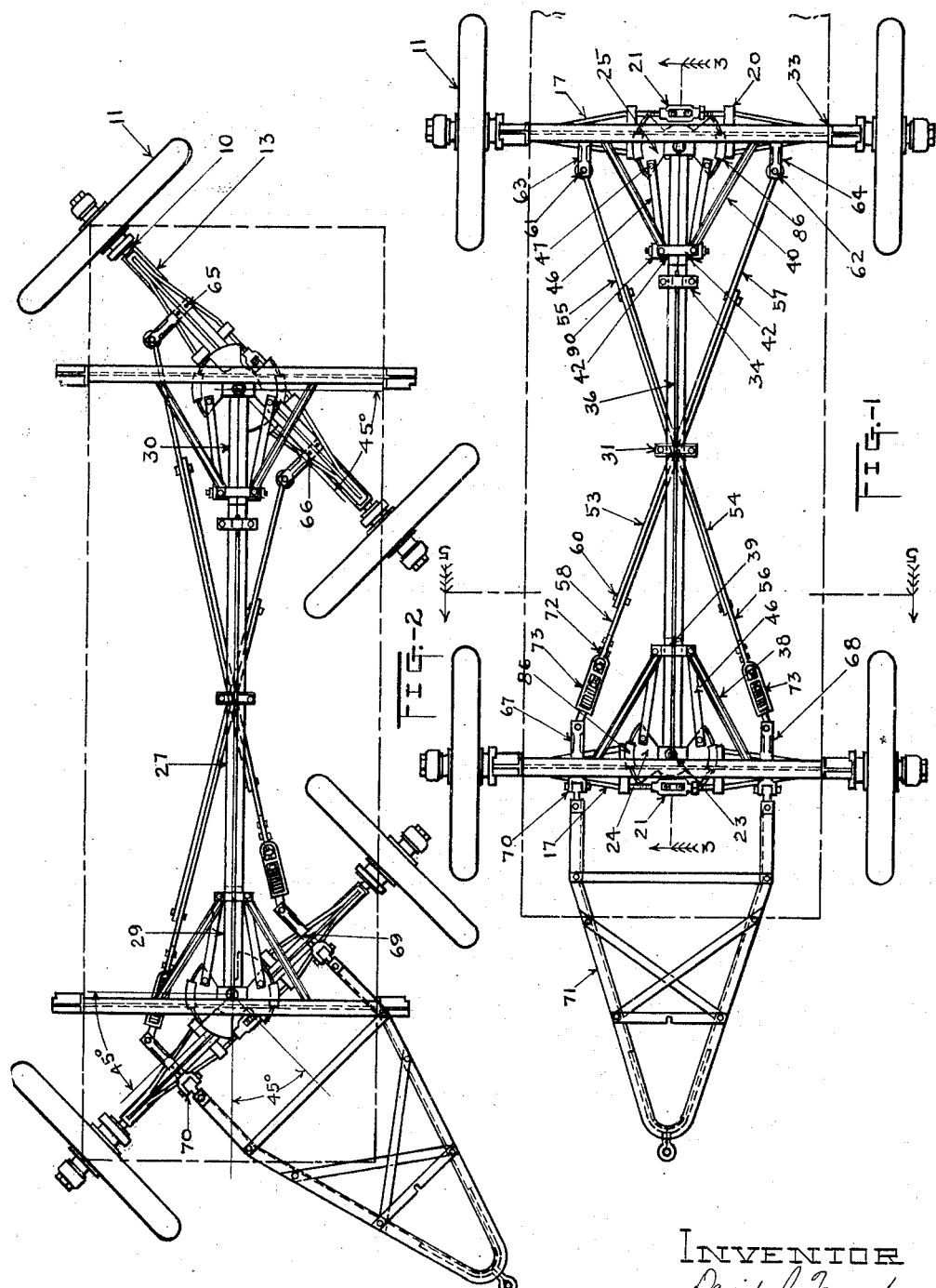

Oct. 15, 1929.  D. I. FOGGER  1,732,006
FOUR-WHEEL TRAILER
Filed May 2, 1927  4 Sheets-Sheet 2
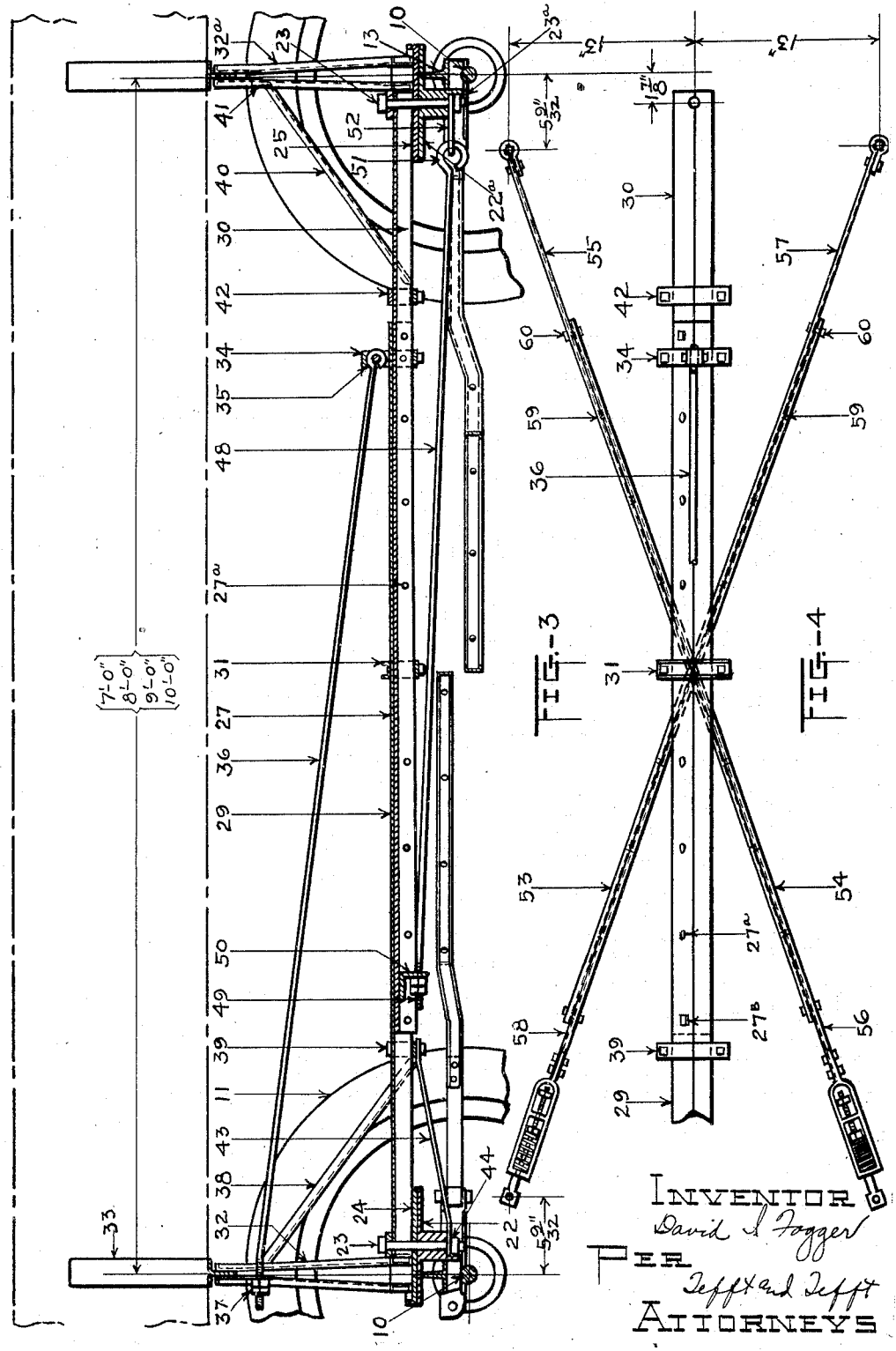

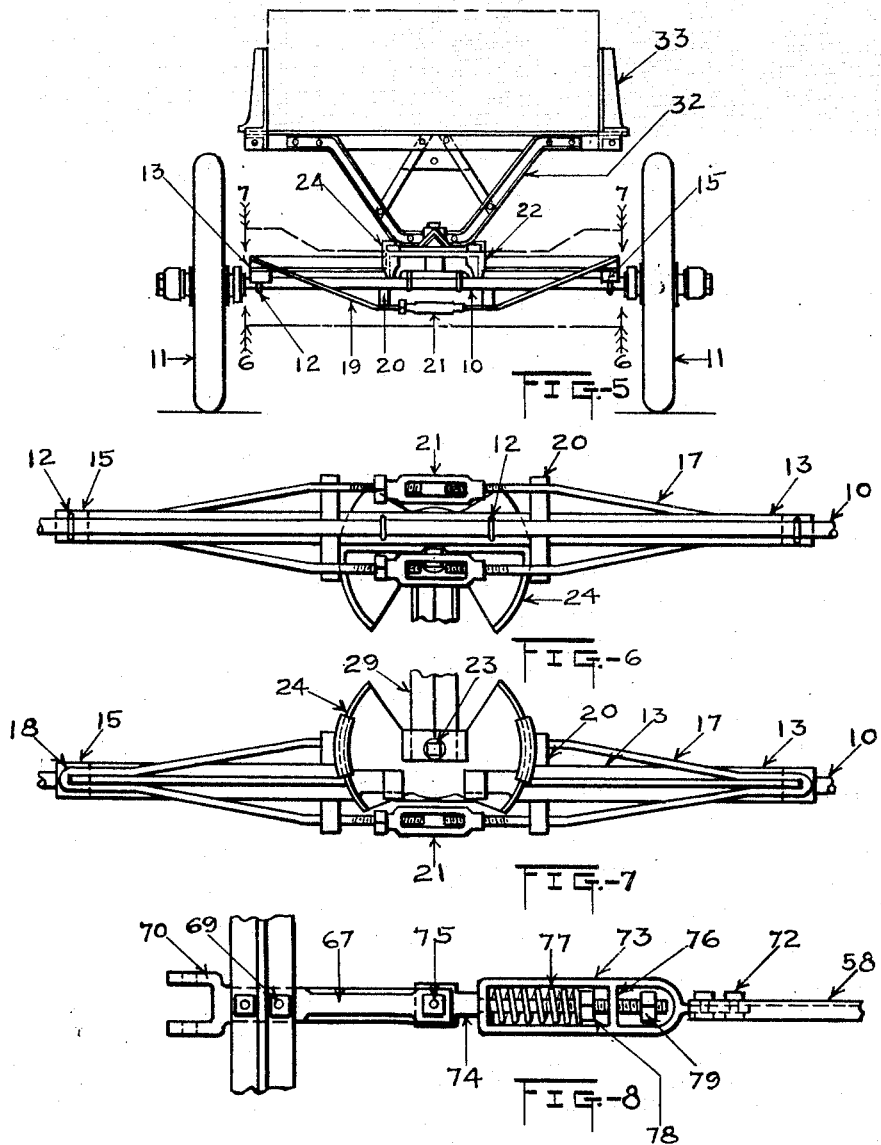

Oct. 15, 1929.　　　D. I. FOGGER　　　1,732,006
FOUR-WHEEL TRAILER
Filed May 2, 1927　　　4 Sheets-Sheet 4
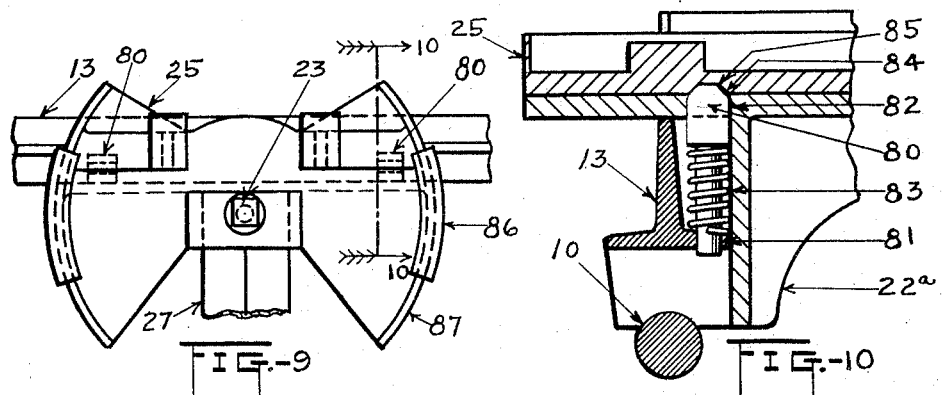
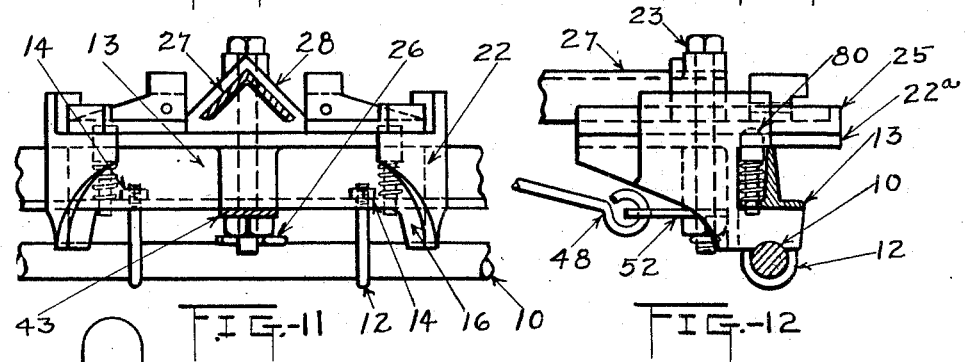
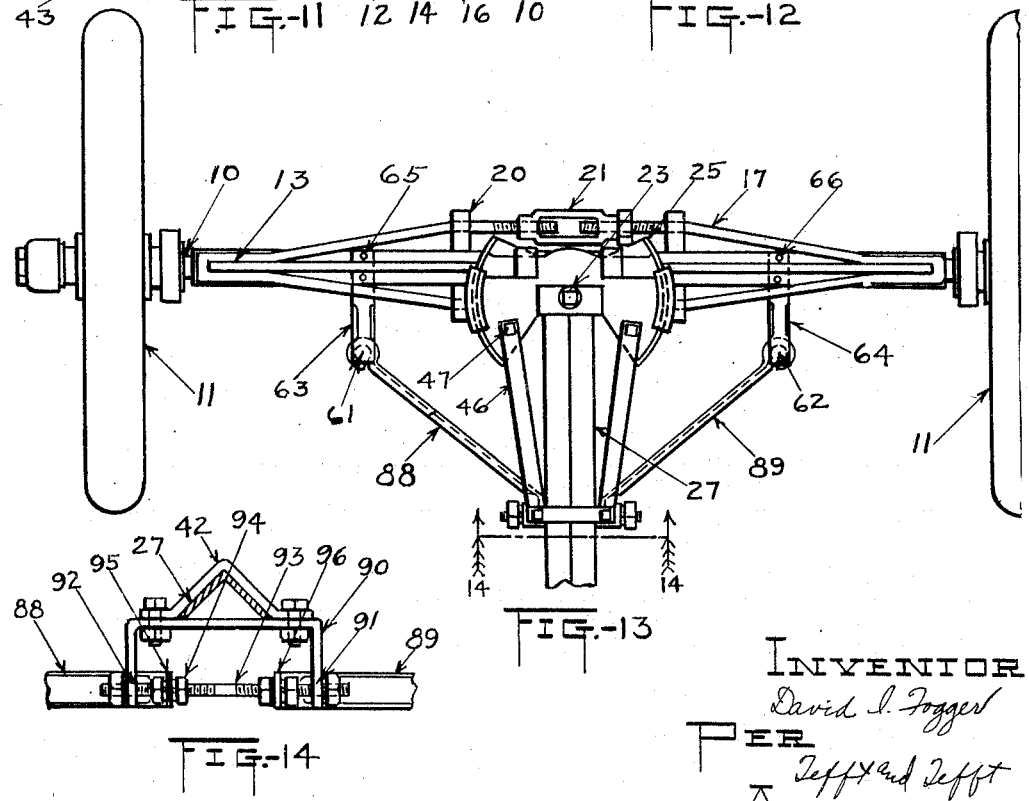
INVENTOR
David I. Fogger
PER
Jefft and Jefft
ATTORNEYS Patented Oct. 15, 1929

1,732,006

UNITED STATES PATENT OFFICE

DAVID I. FOGGER, OF PERU, ILLINOIS, ASSIGNOR TO PERU PLOW & WHEEL CO., OF PERU, ILLINOIS, A CORPORATION OF ILLINOIS

FOUR-WHEEL TRAILER

Application filed May 2, 1927. Serial No. 188,149.

This invention relates to four-wheel trailers.

One of the objects of the invention is in the provision of a four-wheel trailer of such simplified construction as will permit same to be manufactured at an exceptionally low cost.

Another object is in the provision of a trailer mechanism, the same being fashioned almost completely of metal, the axles thereof being movable and connected by cross reaches in such manner as to permit turning of the trailer within a very small radius.

Still another object lies in the provision of a four-wheel trailer constructed and braced not only to provide an extremely rigid and strong trailer structure, but also to include bracing and tensioning mechanism permitting the trailer to be drawn behind a motor vehicle at an exceedingly high speed with no perceptible strain upon the device.

Yet another object lies in the provision of a trailer mechanism, the frame thereof being constructed entirely of metal, said structure being braced in a manner to prevent distortion or strain upon the device while following a motor vehicle at an exceedingly high speed, the rear axle of said trailer being movable with respect to the front axle, but said movement being restricted to a certain degree by means of spring tension friction members.

A further object lies in the provision of a four-wheel trailer mechanism, the axles of which are connected by means of cross reaches permitting an extremely short turning radius without buckling of the device, there being included also adjustable mechanism permitting changing of the trailer to conventional wagon structure with a minimum of adjustment.

A still further object lies in the provision of a four-wheel trailer adapted to be drawn at any desired speed behind a motor vehicle, said trailer mechanism being constructed with spring tension safety members to prevent so-called shimmying or swaying of the trailer when drawn at exceedingly high speed.

An additional object lies in the provision of a simplified four-wheel trailer mechanism, the same including such bracing of the axle and bolster portions as to form a sturdy trailer mechanism, there being also included such fashioning of the various portions as to permit adjustment thereof with a minimum of effort.

Other objects will appear in the following specification, taken in connection with the annexed drawings, in which—

Fig. 1 is a plan view of my four-wheel trailer mechanism;

Fig. 2 is a plan view showing the trailer to be capable of turning movement, without buckling, in an extremely small radius;

Fig. 3 is a side elevation, partially in section, of the trailer;

Fig. 4 is a plan view, showing in detail the spring tension safety connection means for the cross reaches;

Fig. 5 is a front elevation of the trailer;

Fig. 6 is a plan view, from below, showing the manner of bracing the axles;

Fig. 7 is a plan view, from above, of the axle structure;

Fig. 8 is an enlarged detail, showing the spring tension safety connection between the cross reaches and the axle;

Fig. 9 is a plan view of the rear sixth wheel;

Fig. 10 is a sectional view, taken on the line 10—10 of Fig. 9;

Fig. 11 is an elevational view showing in detail the rear sixth wheel and safety means therefor;

Fig. 12 is a side elevation of the parts shown in Fig. 11;

Fig. 13 is a plan view showing the manner of fixedly connecting the rear axle to the angle reach member.

Fig. 14 is a sectional view taken on the line 14—14 of Fig. 13.

Before referring specifically to the drawings for a detailed description of the four-wheel trailer mechanism, it might be stated that this trailer has been constructed entirely of metal, with the exception of the wheel portions, which may be either of wood or metal, as desired. This trailer has been constructed primarily for use by the farmer, the same being of sturdy construction, though designed in such manner that it may be produced at a relatively low cost. The trailer is adapted to be drawn by a conventional motor car, motor truck, or tractor, and has been constructed in such manner that it is capable of withstanding severe strains upon a trailer mechanism when drawn at a rather rapid pace behind a motor vehicle.

It is immediately apparent that in order to construct a trailer mechanism that is adapted to be drawn rapidly behind a motor vehicle, such construction must of necessity be entirely different from the ordinary trailer that is used behind either a tractor or the ordinary farm wagon. The excessive strains that are occasioned by the speed of travel of an ordinary motor car have, in the present instance, been taken into consideration, and the trailer constructed to withstand same.

It is obvious that the present four-wheel trailer mechanism may be clearly distinguished either from the two wheel trailer mechanism, or the ordinary wagon constructions, especially with respect to the latter, inasmuch as a wagon is not adapted, nor under ordinary circumstances would it be possible, to draw same at even an ordinary speed behind a motor vehicle.

Motor cars are brought to a stop quickly, and for this reason a trailer mechanism must be constructed in such manner as to prevent the momentum of weight carried thereby from tending to travel in the direction of movement, upon a sudden halt. Similarly, in trailer mechanism fashioned to have the axle members connected by cross reach portions, thus having their rear wheels move in the same paths as the front wheels, there must of necessity be some means for preventing the so-called shimmying or swaying of the wheels when the trailer is drawn at even an ordinary speed.

The present applicant has constructed a simple and sturdy trailer, and one that may be produced at a relatively small cost. The trailer, as stated before, is adapted primarily for use by the farmer, who may connect same in any suitable manner to his automobile and use said automobile as a power means for pulling the trailer. As a matter of fact, this trailer, within the buying reach of practically any farmer, furnishes a satisfactory and efficient means of hauling his produce, obviating the necessity of his purchasing a motor truck, which, as is well known, necessitates a rather large expenditure of money. The cost of the present trailer, as said before, is within the reach of practically any farmer and he may use same in substantially the same manner as he would a motor truck, with the exception that same must be drawn either by his automobile or some other type of motor, such as a truck or tractor. However, this trailer is designed for use in connection with a motor vehicle that is capable of attaining a speed greater than that of the ordinary horse drawn wagon.

Too much stress cannot be laid upon the construction of this four-wheel trailer mechanism, which permits it to be drawn, without possibility of strain and consequent breakage, behind a motor vehicle that is traveling at a rather high rate of speed. As stated before, this construction includes so-called safety mechanism which is adapted to take up the stresses and strains and to hold the axle members in a yielding, but substantially rigid, manner, irrespective of the speed of travel of the trailer. Also, the present trailer mechanism has been braced with the paramount idea of overcoming the unusual strains that attend the use of a trailer member carrying a considerable load, when same is brought to a sudden halt. It is well to keep in mind also that the present trailer is so fashioned as to permit turning within a very small radius and this turning without any possibility of buckling when the limit of turning movement has been reached.

Referring to the drawings, both the front and rear axle assemblies are fashioned exactly similar, said assemblies including the axles 10, the same carrying upon their outer ends, in a conventional manner, the wheels 11. It has been found practical to adopt the well known automobile wheel and assemble same upon the axle 10 by means of suitable bearing members. These axles 10 are connected by means of depending U-shaped clamps 12, which have their threaded end portions projecting through openings in T-bars 13. Conventional nuts 14 are secured on the clamps 12 in a manner to complete the attachment between the T-bar and the axle. The T-bar is spaced a slight distance above the axle by means of the interposed blocks 15 and portions 16 depending downwardly from the fifth and sixth wheel brackets later to be described. Means for preventing sagging of the axle, due to increased loads, is provided in truss rods 17.

In Figs. 5, 6 and 7, the manner of attachment of these truss rods is clearly disclosed, said rods being bent, as at 18, at their outer ends, in a manner to engage depressions in the outer ends of the T-bars. These truss rods are actually formed of two separate rods, as may be clearly seen, each rod having its inner ends depending downwardly in the manner shown at 19, to a point below the axle. Suitable brackets 20 assist in holding these before-mentioned, downwardly projecting ends 19 at a point below the axle. The adjacent and plural ends of the truss rods are connected by means of the adjustable turn buckles 21.

It is apparent from the above description of the truss rods assembly that the axle is not only prevented from sagging, but, due to the fact that the truss rods are projected downwardly and outwardly towards the connecting turn buckle, the axle assembly is kept from springing forwardly and backwardly, as well as downwardly.

A fifth wheel bracket 22 is secured to the T-bar 13, due to the fact that the downwardly projecting portions 16 thereof are securely held between the lower side of the T-bar and the axle 10, as well as by other connections later to be described. Fifth and sixth wheel brackets are attached not only to the front axle, but also to the rear axle, said sixth wheel bracket being designated there as 22ª. The only difference between said brackets is in the spring tensioned safety members, which will be later described, and which tend to hold the rear axle in a somewhat more tensioned relation. These fifth and sixth wheel brackets, as stated before, are suitably attached to the axle assembly and are adapted to rotate, or rather oscillate, with same. Pivotally attached by means of the king bolt 23 to the fifth and sixth wheel brackets are the fifth and sixth wheels 24 and 25 respectively. The king pin is suitably secured by means of the cotter pin 26, to prevent displacement.

It is apparent that the above described fifth and sixth wheels 24 and 25 do not move, and provide the base for the trailer framing portions and the wagon bolsters. An angle reach, generally described, as 27, connects the fifth and sixth wheels 24 and 25 respectively, the same being apertured at either end to receive the king pins 23.

The manner of inserting the ends of the angle reach in the fifth wheel is shown in Fig. 11, wherein same is projected into a similarly fashioned bracket-receiving portion 28. The angle reach, 27, is actually made up of two parts, namely the portion 29 and the portion 30. This fashioning of the angle reach in two parts permits adjustment, which, as later to be described, is sometimes found necessary, and such parts are secured not only by an intermediate clamp 31, but also by other clamps, later to be described, which are used as means for securing brace rod members.

A careful consideration of the drawings will also show that the angle reach 27 has a plurality of apertures 27ª throughout its length, with bolts members 27ᵇ, which are adapted to secure the plural reach member together not only in a fixed and sturdy manner but also in an adjustable manner.

Rising from the fifth and sixth wheels 24 and 25 respectively, and securely attached thereto at their lower ends, are the bolsters 32 and 32ª, which have the conventional wagon-receiving portions 33 upstanding therefrom. The bolsters have been numbered 32 and 32ª in order to designate the front and rear bolsters respectively.

An additional means for clamping the connecting portions of the angle reach is provided in a clamp 34, to which is pivotally attached, as at 35, one of the ends of a brace rod 36, said rod being adjustably secured, as at 37, to the front bolster 32. It might be stated at this time that this brace rod, which is disposed below a wagon box, not shown, but which is adapted to be placed within the wagon-receiving portions upstanding from the bolsters, is adapted primarily to prevent distortion of the trailer when a sudden stop is made and the momentum of the trailer tends to cause the load to move suddenly forwardly. This brace rod 36 is so connected with the framing portion of the trailer and to the front bolster as to prevent damage to the trailer in this emergency. Another series of rods for bracing the bolsters with respect to the angle reach 27, include two brace rods 38, secured at their upper ends to the front bolster 32, and at their rear ends to a bracket member 39 attached to the front portion of the angle reach designated 29. Exactly similar bracing rods, designated 40, are attached at their upper ends 41 to the rear bolster and at their lower ends to a bracket similar to the one designated 39, but in this instance designated 42. The bracket 39 is also fashioned to receive in a fixed manner the inner ends of brace rods 43, said rods being connected at their other end, as at 44, to the sixth wheel 25. A similar set of rods 46 have their inner ends attached to the bracket 42, and their outer ends secured, as at 47, to the fifth wheel 24. A still further means for bracing the framing structure of the trailer is provided in a brace rod 48, adjustably secured at its forward end, as at 49, in a depending bracket 50, secured to that portion of the angle reach designated 30. The brace rod 48 extends rearwardly and is hooked, as at 51, in a member 52 secured to the lower end of the king bolt 23ª.

The above described bracing means actually overcomes any unnecessary strain imposed upon the trailer structure either during rapid travel thereof with a large load, or when the trailer is brought to a sudden or gradual stop with a partial or full load.

It has been before stated that this trailer mechanism is adapted to be drawn behind a motor vehicle, and for this reason the axle portions have been so connected by cross reach members as to permit the rear wheels to travel in the paths of the front wheels. It is necessary that the trailer mechanism be capable of turning within a reasonably short radius, and in order to provide a trailer having these advantages, applicant has devised a cross reach connection between the oscillating axles so as to permit not only a short turning radius, but also such short turning radius as will absolutely prevent buckling when either at or approaching its extreme turning movement. Also, it may be positively stated that any ordinary cross reach connection between oscillating front and rear axles is not practicable unless such connection is made with some sort of safety mechanism to prevent the so-called shimmying or swaying of the wheels of the trailer when moving at a high rate of speed.

The cross reaches have been designated 53 and 54 respectively, each being made up of dual portions, those making up cross reach 53 being designated 55 and 56, and those making up cross reach 54 being designated 57 and 58. One of the reasons for constructing said cross reaches in two parts is to permit adjustment in their length. This adjustment is taken care of by forming a plurality of adjustable openings, indicated at 59, in the cross reach members, bolts 60 being adapted to be inserted therethrough in a manner to fixedly secure the respective portions of the cross reaches firmly together. The rear ends of the cross reaches are secured at 61 and 62 to rearwardly projecting portions 63 and 64, same being bolted, as at 65 and 66, to the rear axle assembly, perhaps most clearly shown in Fig. 13. The forward ends of the cross reach members are secured to corresponding members 67 and 68 respectively. These portions are similarly secured to the front axle assembly by means of the conventional bolt members 69.

As a matter of fact, the members 67 and 68 project beyond and forwardly of the axle assembly and form bifurcated receiving portions 70 for the draw bar structure, which in the present application has been referred to generally as 71 and is fashioned to be connected in any desired manner with a motor vehicle of one type or another, or at least some means for drawing the trailer.

The connections between the forward ends of the cross reaches 53 and 54 are such as to necessitate perhaps other than an ordinary description, in view of the fact that this tension connection between the members 67 and 68 connected with the front axle provides a safety connection of considerable importance. Adjustably bolted, as at 72, to the forward ends of the cross reaches 53 and 54, is a yoke 73. The yoke at one end, as stated before, is adjustably connected at 72 with the cross reach members. The connection between said yoke and the members 67 and 68 includes separate rods 74 bolted, as at 75, to the portions 67 and 68, the rear ends of said rod 74 projecting through apertures in the base of yoke 73 and further projecting through other apertures in cross portion 76 in said yoke. Lying within the yoke and surrounding the rods 74 are coil springs 77. Nuts 78, threaded upon the rods 74, provide means for finally securing the rods 74 to the yokes 73 and as a matter of fact, indirectly the members 67 and 68 with the respective cross reaches 53 and 54.

It may be stated at this time that when the forward and tensioned ends of the cross reaches are connected with the brackets 67 and 68, it is found practicable to contract the coil springs in making the connections, in order that the initial slight turning movement of the front oscillating axle assembly will not be transmitted immediately to the reach rods. It is apparent, however, that when this initial contraction of the coil springs has been released, thereafter turning will be transmitted to the reach rods.

Additional nuts 79 provide safety connections for the spring tension connecting means above described, between the cross reaches, and as a matter of fact, the front axle assembly. The above tension connection between the cross reaches and the front axle assembly is such as to occasion, at all times, a tension connection between the oscillating rear axle assembly and the oscillating front axle assembly. In other words, should the cross reaches be merely secured in the ordinary manner and the trailer drawn rapidly behind a motor vehicle, any play between the cross reaches and the axle assemblies would result in a so-called shimmying of the trailer or a gradual swaying that would be increased directly with the speed to a point that would be dangerous. It is to overcome this shimmying or swaying that the safety tension connection between the cross reaches and the front axle has been provided.

Further, in an effort to overcome the so-called swaying that may be caused by a trailer mechanism, wherein both axles oscillate, a friction connection between the sixth wheel bracket 22ª, and the sixth wheel 25, has been provided. This tensioning of the sixth wheel bracket 22ª to the sixth wheel comprises spaced dogs 80 slidable at their lower ends in apertures 81 in the T-bar, their upper or friction ends projecting through apertures 82 in the sixth wheel bracket. Means for holding the dogs in a raised position is provided in tension coil springs 83. The upper ends of the dogs 80 are somewhat beveled, as shown at 84, and are adapted to lie within detents 85 corresponding to the shape of the upper ends of the dogs, said detents being disposed upon the lower face of the sixth wheel 25. The dogs and their respective detents are disposed in such manner as to at least assist in holding the rear axle assembly at right angles with the angle reach member 27. The seating of these dogs within the recesses in the sixth wheel merely applies a frictional resistance against the turning of the rear axle assembly, such tension not being of a nature to absolutely prevent the turning of the rear axle, but to resist same to such a degree as to prevent every little movement of the front axle, and therefore the cross reaches, from being transmitted to the rear axle. The reason for this has been, to some extent, explained before, and is to prevent swaying of the trailer when being drawn rapidly behind a motor vehicle. In other words, if there is any substantial looseness in the rear axle assembly when a certain speed has been attained, this looseness gradually becomes what is commonly known among automobile drivers as a shimmying, setting up a swaying of the wheels that ordinarily can be overcome only by reducing the speed of the vehicle until such movement ceases. Especially in a trailer fashioned in the present manner is there a liability of such shimmying movement, in view of the fact that the rear axle assembly oscillates with the front axle, as stated before, to permit short turning radius. However, in the above construction, the rear axle is held normally in substantially fixed position, and movement of a very slight nature is not immediately transmitted thereto, but there is a requirement for a certaain degree of turning of the front wheels to move the sixth wheel bracket away from the sixth wheel.

This peculiar tensioned dog arrangement between the sixth wheel bracket and sixth wheel is of such a nature as to assist also in preventing the swaying of the trailer, in that whenever the axle passes its normal center, the dogs immediately enter their detents and act substantially to lock the axle against movement.

With respect to the fashioning of the sixth wheel bracket with the sixth wheel, it might also be stated that under certain conditions it might be advisable to utilize this frictioning arrangement upon the fifth wheel and fifth wheel bracket.

At this time, attention might be called to the manner of disposing both the fifth and sixth wheels upon the fifth and sixth wheel brackets. In each instance, the brackets have upstanding flanges 86, which act as guiding means for downwardly projecting rims 87 on the fifth and sixth wheels. This guiding of the sixth wheel and sixth wheel bracket is of material assistance when the above described friction mechanism is in play, in that irrespective of any looseness that may be occasioned about the king bolt, or play in the vehicle, nevertheless this guiding means always insures a positive operation of the spring tensioned dogs and the corresponding detents.

Having described in detail the construction of the present four-wheel trailer when it is desired that the rear axle assembly oscillate with the front axle assembly, it might be stated that it was only after a great amount of experimentation that the exact distances were calculated at which the connections could be made between the front ends of the cross reaches and the members 67 and 68, to which same are attached. As a matter of fact, it was found necessary to project the members 67 and 68 rearwardly from the plane of the king bolt exactly $5\frac{9}{32}$ inches. This applies as well to the forward projection of similar brackets from the rear axle assembly. It was also found that the efficient connecting point for the reach members was a thirteen inch radius from the king bolt. Thereupon, having provided the proper angles for connection with the members 67 and 68, it was found that the trailer could be turned efficiently and without buckling, with the axles at substantially any possible angle from the plane of their normal position. This is an extraordinary turning movement, without buckling, in vehicles having oscillating axles, at least when the axles have been turned to such an extreme turning radius.

As a matter of fact, the present trailer mechanism has a peculiar arrangement of cross members which may not be apparent. All cross reach mechanism known to applicant is of a nature where when one of the oscillating axles is turned, there will be an immediate buckling of one or other of the reaches before movement is transmitted to the rear axle. If the buckling does not take place immediately, it will occur somewhere during the turning movement of the axles. This is a rather broad statement to make, but it will be found, by careful consideration, that in substantially all vehicles having cross reaches that either a slot or some compensating mechanism is used to take care of this above mentioned buckling action.

Applicant went through a long period of experimentation before arriving at the proper angles and arrangement of parts to permit such connection of the cross reaches as would permit proper movement of the cross reaches, without buckling, and still have a tight connection between the front and rear axles. Under these conditions, with applicant's computation of the angles and connection of the reach members, this efficient turning movement could be accomplished without buckling of the reach members, which were tightly connected, and this irrespective of the angle of the turning movement.

In Figs. 13 and 14 of the drawings, there is shown the manner of fastening the rear axle assembly to the cross reach in case it is desired that the trailer be formed without oscillating axles, but with a fixed rear axle. This adjustment, in ordinary circumstances, is necessary in case it is desired that the trailer be used as an ordinary wagon, and it is well known that under these conditions the rear axle is fixed. Also, under such conditions, it is necessary to remove the cross reaches and to provide auxiliary brace rods 88 and 89. These members are hooked to the members 63 and 64 respectively and project inwardly and forwardly towards a special bracket 90, the same being apertured as at 91 and 92 to receive a longitudinally disposed bar 93 threaded in a manner to receive a plurality of adjustable nuts 94 thereon. The ends 95 and 96 of the braces 88 and 89 respectively are apertured in such manner as to be secured to the adjustable bar 93 and the plural nut members 94 provide means for securing ends 95 and 96 securely to the bar 93, as well as to permit adjustment laterally to a considerable degree.

It is apparent that this means for adjusting the members 88 and 89 is merely a means for fixedly securing the rear axle assembly to the angle reach 27 and to hold same in exactly the right angular relation thereto.

Perhaps there has not been sufficient explanation of the reason for providing an adjustment of the length of the trailer, but as a matter of fact, in different portions of the country, wagon boxes of different size have been used, and applicant's trailer has been designed and built, as respects adjustment features, to permit extension of the trailer to take care of wagon boxes of from seven to ten feet. The actual mechanism permitting this adjustment has been described, and includes a longitudinal adjustment of the angle reach and a lengthwise adjustment of the cross reaches. It is apparent that all the farmer has to do is to remove the bolt members in the angle reach and the cross reaches and then to lengthen out the trailer, thereafter replacing the bolts, whereupon the trailer will again assume a sturdy and compact original structure.

Another feature to be considered is that it is apparent that the brace rod connections, namely 36 and 48, need no adjustment whatever, inasmuch as they are permanently fixed initially to the respective portions of the angle reach, and always assume, irrespective of the length of the trailer, the same bracing relationship therewith.

What I claim is:

1. A trailer mechanism comprising a framing portion, axle assemblies, wheel members, fifth wheel mechanism permitting oscillation of the axle assembly with respect to the framing portion, said fifth wheel structure comprising a fifth wheel, a fifth wheel bracket, means for guiding the fifth wheel with respect to the fifth wheel bracket, and spring tensioned lugs disposed upon the fifth wheel bracket and adapted to engage detents in the fifth wheel in a manner to apply friction relationship therebetween.

2. A trailer structure comprising a framing member, axle assemblies operatively connected to said framing member, one of said axle assemblies adapted to oscillate with respect to the framing portion, a fifth wheel bracket disposed on said oscillating axle assembly, a fifth wheel carried by the framing portion, and a friction means disposed between the fifth wheel bracket and fifth wheel for initially resisting the turning movement of the oscillating axle and to substantially lock same in a tensioned manner.

3. A trailer structure comprising a framing member, oscillating front and rear axle assemblies operatively connected thereto, cross reaches connecting said axle assemblies, the rear axle assembly including a sixth wheel mechanism, the latter comprising a sixth wheel, a sixth wheel bracket, and friction members secured in a tensioned manner to the sixth wheel bracket, and adapted to apply a considerable degree of friction upon the sixth wheel in a manner to initially resist the turning movement transmitted to the rear axle assembly.

4. A trailer structure comprising a framing member, oscillating axle assemblies operatively connected to said framing portion, cross reaches connecting the axle assemblies, one of said axle assemblies including a mechanism for initially resisting the turning movement transmitted to the axle assembly, said mechanism including a stationary plate having recesses therein, and a movable plate disposed adjacent said stationary plate, the movable plate having tensioned friction members connected thereto in a manner to normally engage the recesses in the stationary plate, and to initially resist the turning movement transmitted to said axle assembly.

5. A trailer structure comprising a framing portion, front and rear axle assemblies, wheel portions, a reach member connecting the front and rear axle assemblies, said reach member comprising two angle members, clamping and bolt mechanism for holding the angle members securely in position, as well as permitting adjustment longitudinally, cross reaches connecting the axle assemblies in a manner to permit short turning radius, said cross reaches being fashioned to permit lengthwise adjustment in a manner to cooperate with the adjustable reach member, whereby a degree of adjustment of the length of the trailer may be accomplished.

6. A trailer structure comprising a framing portion, front and rear axle assemblies, wheel portions, a reach member connecting the front and rear axle assemblies, means for bracing the rear axle with respect to the reach member and mechanism permitting lateral adjustment of the brace rods with respect to the reach member in order to insure a right angular relationship of the rear axle and reach member.

In testimony whereof, I have hereunto affixed my signature.

DAVID I. FOGGER.